April 17, 1928.                                              1,666,621
D. H. GREENWOOD
COMBINATION SUCKER ROD ELEVATOR AND SPIDER
Filed March 1, 1926

INVENTOR.
D. H. GREENWOOD
BY Fred H Hayn.
ATTORNEY.

Patented Apr. 17, 1928.

1,666,621

UNITED STATES PATENT OFFICE.

DOLPHICE H. GREENWOOD, OF LOS ANGELES, CALIFORNIA.

COMBINATION SUCKER-ROD ELEVATOR AND SPIDER.

Application filed March 1, 1926. Serial No. 91,503.

My invention relates to oil well equipment devices, and more particularly to those appliances adapted to be associated with the tubing whereby the sucker rod operated in said tubing may be clamped and held in position, means being associated with the device whereby said sucker rod may be elevated, although in its broader aspects it is not my intention to limit the same to such.

It accordingly is an object of my invention to provide a novel form of combination sucker rod elevator and spider in which a body equipped with an elevating means, if desired, in the shape of a bail, has positioned therein a set of slips, preferably wedge-shaped, which slips have associated therewith a set of operating elements comprising preferably a set of shafts, associated also with said body, and which shafts have associated therewith a set of levers, and a cross-bar whereby said levers and shafts may be operated in unison to lower and raise said slips, so that the sucker rod may be held in clamped position or when raised, to be free from said sucker rod, so that it may be removed from the device.

It is also within the province of my invention to provide a novel form of device in which a set of tapered slips may be made to coact with the body with which they are associated so that when said slips are in raised position said body may support said slips.

It is also an object of my invention to provide a novel form of device which is simple in operation, easy and inexpensive to manufacture, composed of a minimum number of parts, and one which will thoroughly and reliably effect the objects intended.

Further objects and advantages of my invention will become more apparent as the description thereof proceeds.

Figure 3:
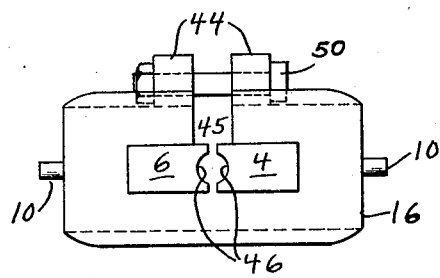
Figure 4:
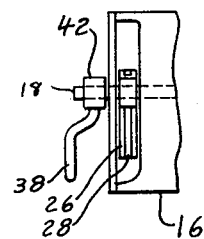

Reference is had to the accompanying drawings, in which similar reference characters denote similar parts. In the drawings, Fig. 1 is a fragmentary front elevational view of my novel form of device, certain parts being broken away, and in section, the parts being shown in clamping position in relation to the sucker rod, Fig. 2 is a similar view, but showing the clamping slips in the position they assume when in fully elevated position and free from the sucker rod, Fig. 3 is a top plan view of the device free from the oil well tubing and sucker rod, and Fig. 4 is a fragmentary detail view showing a suggestive means for operating the slips or clamping elements.

Describing my invention more in detail, I provide a body 16 of any preferred contour, and constructed of any suitable material which body is adapted to be positioned on the tubing 14 of an oil or other well, said tubing having positioned therein the sucker rod 12 of the pump, the main purpose of my invention being to provide a means whereby said sucker rod may be held in clamped position, and at the same time may be inserted within or removed from the device with facility without removing said device from its position on said tubing.

Figure 1:
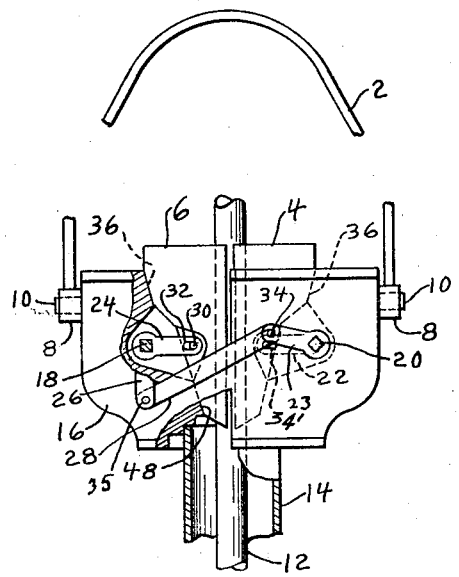
Figure 2:
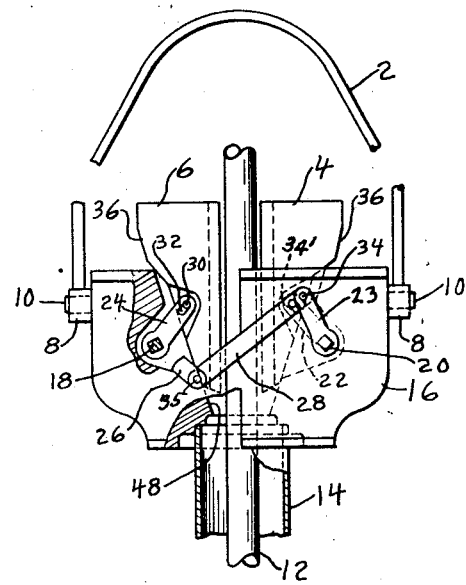

The body or spider 16 may be cast, pressed or formed in any manner preferred, which body is hollowed out as shown more particularly in Figs. 1 and 2, a set of slips or clamping elements or members 4 and 6, preferably two in number, being positioned within said hollowed-out portion and adapted for relative movement with respect to said body.

The slips 4 and 6 are preferably wedge-shaped, and equipped with tapered portions 36 and 48, which tapered portions have a third tapered portion 37 therebetween, defining a ledge, the hollowed-out portion of the body 16 being tapered to correspond, as clearly depicted in Figs. 1 and 2. Said body is also provided with a means whereby it may be supported, said means preferably comprising a pair of trunnions or extensions 10, associated in any manner preferred with the body 16, a bail or other member 2, equipped with eyes 8 for engagement with said trunnions being provided for elevating the device. Of course, any other means for elevating the spider or body 16 may in practice be substituted for that just described.

The slips 4 and 6 are cut away at 46, as shown more particularly in Fig. 3, which cut-away portions may be grooved or smooth, as in practice preferred, and are adapted to provide a means for gripping the sucker rod 12.

The means for operating the slips 4 and 6, preferably comprises a pair of shafts 18 and 20, mounted in any preferred manner on the body 16, said shafts being desirably squared as clearly shown in Figs. 1 and 2 to hold securely the levers 24, 26, 22 and 23, the levers 26 and 23 being connected by means of a cross-bar 28, so that said levers may be operated in unison, suitable pivot pins 34 and 35 being provided for this purpose.

The lever 24 is connected to the slip 6 by the pin and slot connection 30 and 32, and the lever 22 is connected to the slip 4 by a similar connection 34', the purpose of which is to permit a certain amount of play in order that the slips may properly and easily be returned to gripping position, as depicted in Fig. 1.

As shown in Fig. 4, either shaft 18 or 20 may be equipped with an operating handle 38 of any preferred type, which handle has a shaft engaging portion 42, pinned or otherwise fastened to said shaft. By turning either shaft 18 or 20 by means of the handle 38, the levers 22 and 24 are turned in the arc of a circle the levers 23 and 26 being operated in unison by the cross-bar 28.

As depicted in Fig. 1, the clamping slips 4 and 6 are in engagement with the sucker rod 12, and the weight thereof will cause the tapered portions of the body 16 and those of the slips to wedge tightly within said body, the greater the weight of the rod 12, the tighter the slips will be wedged in place, and of course securely holding the rod in position.

To release the sucker rod, the handle 38 is turned, the levers, as above explained, raising the slips 4 and 6 in unison. In their fully elevated position, the tapered portions 36 will be in the position depicted in Fig. 2, the slips resting on top of the body 16.

To elevate the sucker rod 12 and my device, the usual hook is applied to the bail 2, the parts being in the position shown in Fig. 1, after which the assembly may be elevated bodily and removed from the well.

To insert the sucker rod within the device, or remove it therefrom, the body 16 is provided with a cut-away portion 45, which permits the sucker rod to be inserted or removed from the device without disturbing said device, a pair of recessed ears or lugs 44, equipped with a locking bolt of some sort, such as an ordinary bolt, 50, or the like, associated with said ears. This construction effectively prevents any possibility of the opening of the device, due to any excessive weight being placed on the slips 4 and 6.

While I have thus described my invention with great particularity, it will be obvious that the same may be modified throughout a wide range. I, therefore, do not propose to be limited to the exact details of construction shown and described, but reserve the right in practice to make any and all modifications thereof that fall within the scope of the appended claims.

I claim as my invention:

1. A device of the class described comprising in combination, a body provided with a recessed portion, a pair of wedge-shaped elongated clamping slips, each equipped with a ledge positioned at a substantial distance below the top of said slips, and operating means, positioned within the recessed portion of said body for alternatively causing said slips to clamp a member inserted in said body or be positioned by means of said ledges on the top of said body.

2. A combination sucker rod elevator and spider comprising a recessed body equipped with elongated tapered guiding portions extending substantially the entire length of said body, said body being provided with means for inserting laterally therein a member to be clamped, removable means on said body to prevent the separation thereof, due to excessive weight placed on said body, a pair of elongated bodily movable slips, tapered to correspond with the taper of said guiding portions, said slips being of such a length as to extend substantially the entire length of said body and above the same to provide a maximum gripping surface for said slips, and means positioned within the recessed portion of said body whereby said slips may be simultaneously operated.

In testimony whereof I have signed my name to this specification.

DOLPHICE H. GREENWOOD.